United States Patent
Wagner

Patent Number: 5,156,425
Date of Patent: * Oct. 20, 1992

[54] RESILIENT VEHICLE SIDE BUMPER

[76] Inventor: Scott J. Wagner, 28 Westwood Dr., Fort Madison, Iowa 52627

[*] Notice: The portion of the term of this patent subsequent to Nov. 13, 2007 has been disclaimed.

[21] Appl. No.: 487,923

[22] Filed: Mar. 5, 1990

[51] Int. Cl.⁵ .............................................. B60R 19/42
[52] U.S. Cl. ...................................... 293/128; 293/155
[58] Field of Search ............... 293/128, 154, 155, 102, 293/1; 280/770

[56] References Cited

U.S. PATENT DOCUMENTS

| | | | |
|---|---|---|---|
| 1,610,598 | 12/1926 | Boscariol | 293/155 X |
| 2,734,765 | 2/1956 | Henderson et al. | |
| 3,472,546 | 10/1969 | Samuels | |
| 4,674,783 | 6/1987 | Hogan | 293/128 |
| 4,707,008 | 11/1987 | Falco | |
| 4,708,380 | 11/1987 | Cruz | 293/128 |
| 4,726,614 | 2/1988 | Myers et al. | 293/128 |
| 4,796,935 | 1/1989 | Maraia | 293/128 |
| 4,828,303 | 5/1989 | Soria | 293/128 |
| 4,969,674 | 11/1990 | Wagner | 280/770 X |

*Primary Examiner*—Margaret A. Focarino
*Assistant Examiner*—Gary C. Hoge
*Attorney, Agent, or Firm*—Kent A. Herink; Brian J. Laurenzo

[57] ABSTRACT

A resilient vehicle side bumper including a resilient body member having a forward section and a rearward section. Coacting end portions of the forward and rearward sections are releasably joinable to form the body member. A rotatable locking tab extends from the back or vehicle side of the forward and rearward sections for releasably locking the side bumper to the vehicle. Expansion and compression sites are provided adjacent the locking tab to facilitate flexion of the body member. A plurality of suction cups and magnet strips on the vehicle side of the male and female portions releasably adhere the body member to the vehicle.

8 Claims, 4 Drawing Sheets

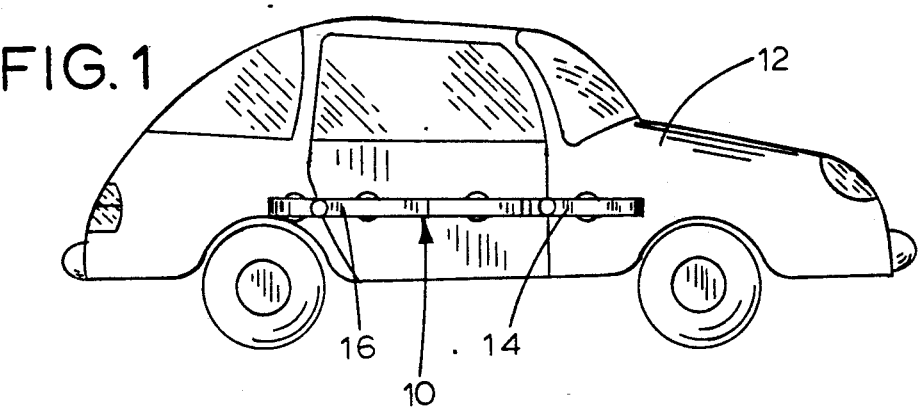
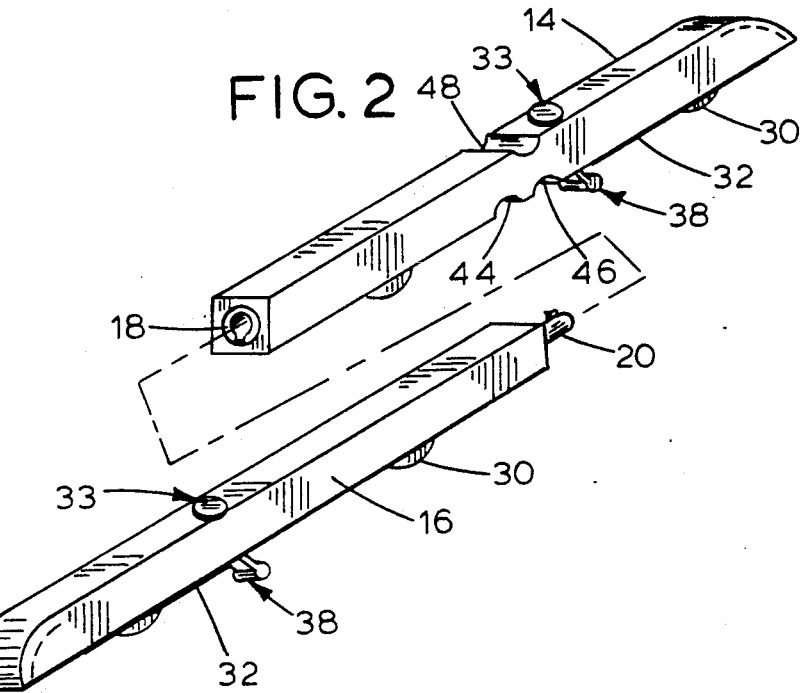
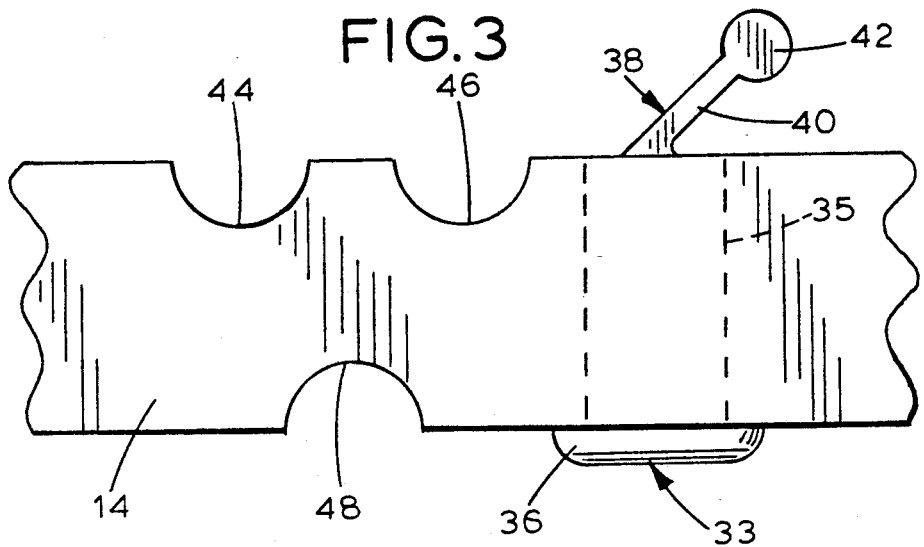

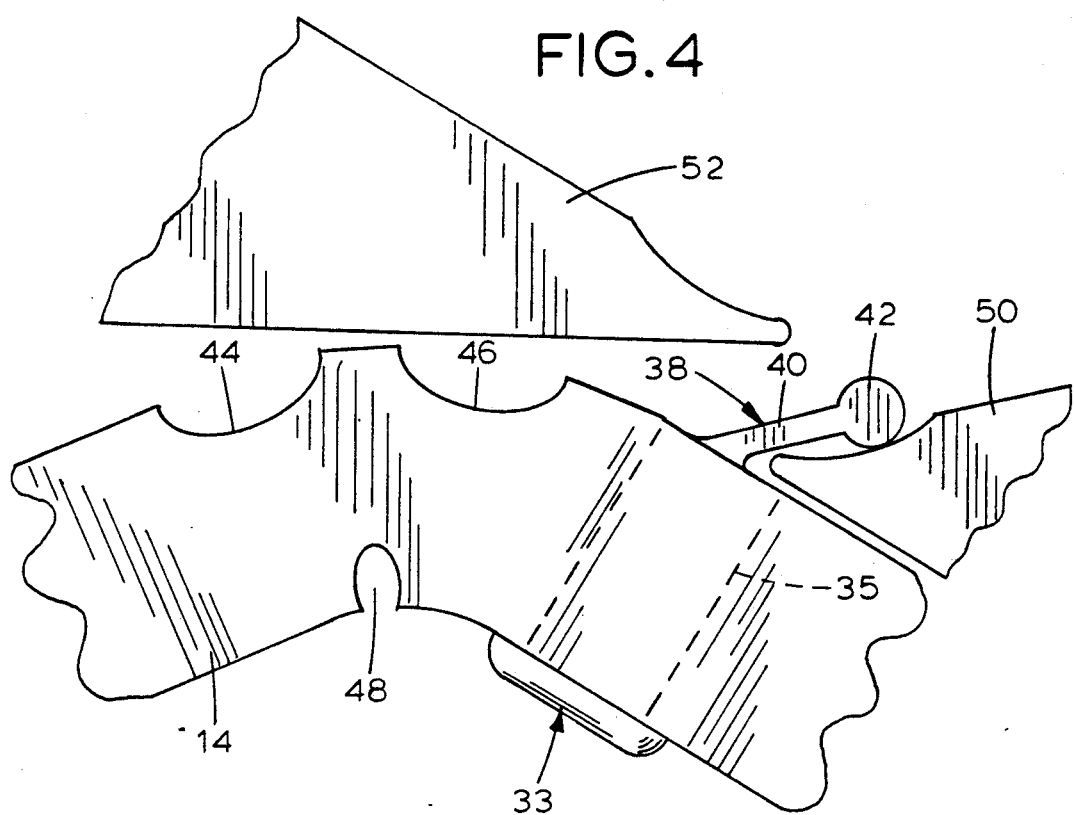
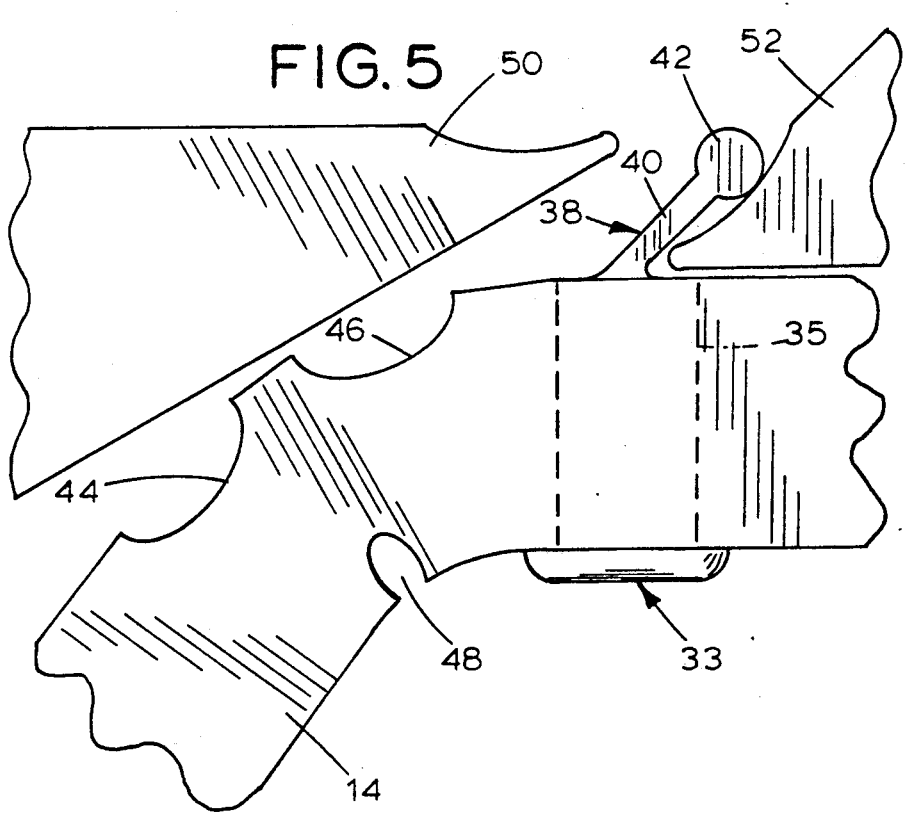

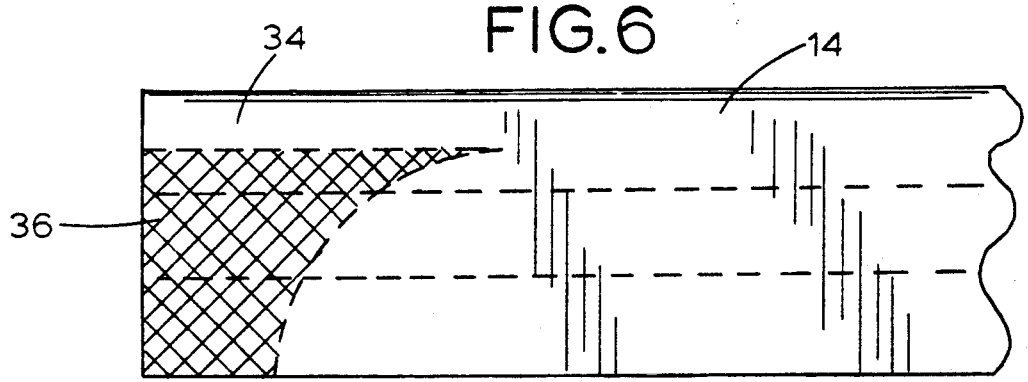
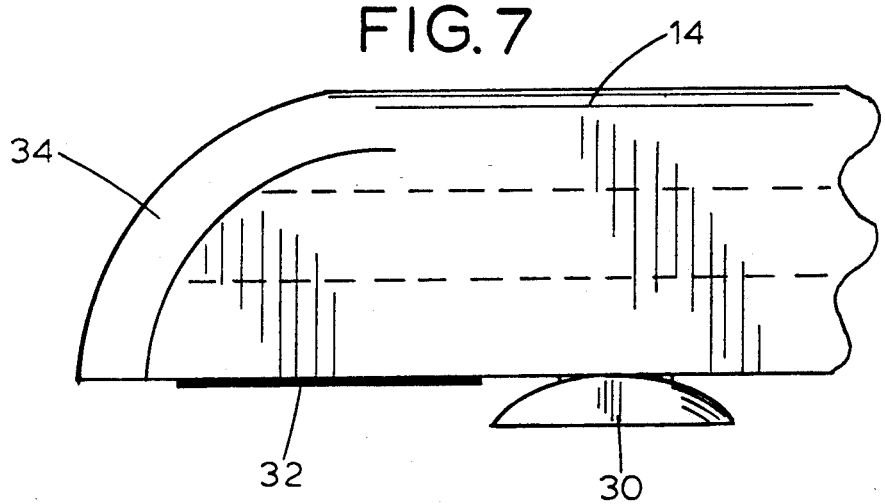
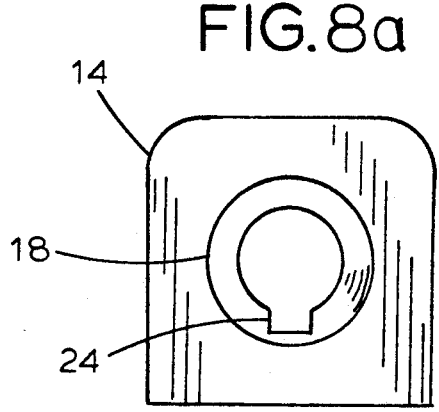

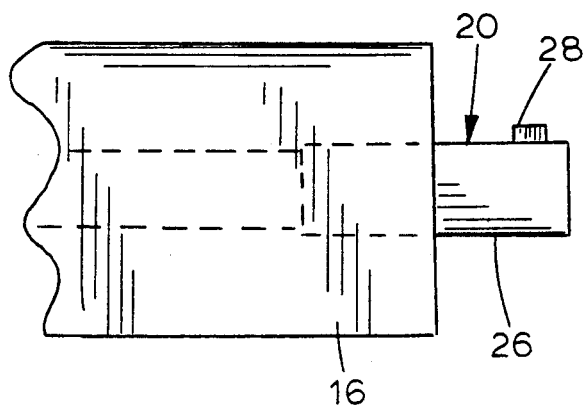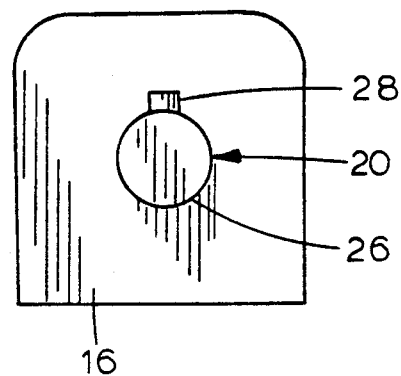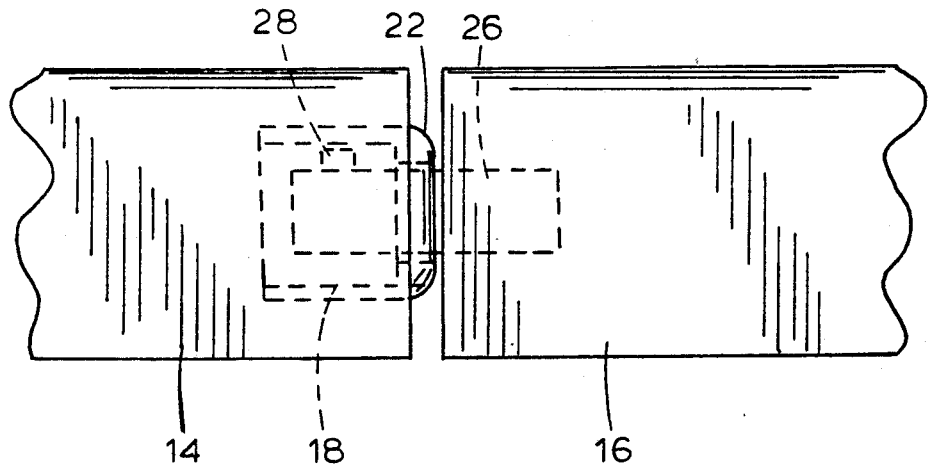

RESILIENT VEHICLE SIDE BUMPER

BACKGROUND OF THE INVENTION

This invention relates to resilient bumpers for the sides of vehicles and, more particularly, to a resilient bumper for releasable attachment to the side doors of a vehicle for protection of the vehicle against damage from impact of a door of another vehicle or the like.

To conserve the amount of space required for parking vehicles, owners of parking ramps and parking lots, as well as civil engineers who design municipal parking areas, make the sizes of individual parking places relatively narrow. As a result, adjacent vehicles are usually so close that an uncarefully opened door of one vehicle will come into contact with the side of an adjacent vehicle. If the contact is sufficiently violent, the finish of one or both vehicles may be damaged, a dent may be made in the side of the contacted vehicle, or both. While many vehicles are provided with a fixed body side molding intended to protect the side of the vehicle, such moldings are often not in the appropriate position to prevent damage from contact with another vehicle door or the like.

Flexibility in positioning a side bumper is, accordingly, desirable. It is also desirable, however, to prevent theft of the side bumper from the vehicle. Moreover, vehicles vary greatly in the size and shape and contour of their sides and doors so that any side bumper must be adaptable to be usable with the variety of different vehicles.

A number of attempts have been made to provide side bumpers for vehicles. One such bumper is disclosed in U.S. Pat. No. 3,472,546, which teaches a side bumper made of resilient material to the end portions of which are secured retaining hooks for attachment of the side bumper to edges of a door panel of the vehicle. Another side bumper is taught in U.S. Pat. No. 2,734,765, which uses a combination of suction cups and hooks for releasable attachment to a side door of a vehicle. A side bumper which uses both suction cups and magnets, and which is releasably held at edges of the vehicle doors, is disclosed in U.S. Pat. No. 4,707,008, which can be used on both ferrous and nonferrous vehicles.

None of the prior art devices, however, are of adjustable length to accommodate a variety of vehicle door sizes and shapes. Further, while the '008 patent does describe a locking device which will prevent theft of the device off of a vehicle, the locking device is relatively inflexible to anything but vertical edge contours of vehicle doors.

The present invention includes a means for releasably locking the device to a vehicle having other than vertical door edge contours.

SUMMARY OF THE INVENTION

The present invention is a resilient side bumper for vehicles and includes a main body member made of molded or extruded resilient material such as plastic or rubber. The body member is comprised of a forward portion and a rearward portion that are releasably interconnected when in use on the vehicle. The forward portion and the rearward portion are each provided with a locking device which extends downwardly from the bottom surface of each portion toward the vehicle. Additionally, a plurality of suction cups or magnet strips are attached to the bottom or vehicle-facing surface of each of the forward portion and the rearward portion.

The resilient side bumper is attached to a side door or adjacent fender of a vehicle by insertion of the locking device of the forward portion into the gap between the front fender of the vehicle and the open side door of the vehicle. The length of the resilient side bumper is adjusted so that the locking device of the rearward portion is adjacent the rearward edge of the side door. When the side door of the vehicle is closed, the locking members prevent removal of the side bumper from the vehicle. The locking devices are rotatable relative to the forward and rearward portions of the main body member to adjust to nonvertical door edges.

BRIEF DESCRIPTION OF THE DRAWINGS

FIG. 1 is a side view of a vehicle on which has been mounted a pair of resilient side bumpers of the present invention and which depicts both sides of the vehicle in that the other side is identical except facing in the other direction;

FIG. 2 is an exploded perspective view of the resilient side bumper;

FIG. 3 is a partial side view of the resilient side bumper;

FIG. 4 is a partial plan view of the resilient side bumper attached to first vehicle and showing the fender and a partially open door of the first vehicle;

FIG. 5 is a partial plan view of the resilient side bumper attached to a second vehicle and showing the fender and a partially open door of the second vehicle;

FIG. 6 is a side view of a free end portion of the resilient side bumper showing material to be removed in the formation of a rounded end portion;

FIG. 7 is a side view of the free end portion of FIG. 6 wherein the rounded end portion has been formed and a suction cup and magnet strip attached to the bumper;

FIGS. 8a and 8b are an end view and side view of the inner end portion of one section of the bumper showing the female portion of a connection device for interconnecting the two sections of the bumper;

FIGS. 9a and 9b are a side view and an end view of the inner end portion of one section of the bumper showing the male portion of the connection device; and FIG. 10 is a side view of the two sections of the bumper interconnected together and showing the male and female portions of the connection device in dotted line.

DETAILED DESCRIPTION OF A PREFERRED EMBODIMENT

Illustrated in FIG. 1, generally at 10, is a resilient vehicle side bumper attached to the side of a passenger vehicle 12. The side bumper 10 includes a forward portion 14 and rearward portion 16 (FIG. 2) which are of a resilient material. In a preferred embodiment of the invention, the forward and rearward portions are made of extruded cross-linked polyethylene with a cylindrical hollow inner core.

The forward portion 14 has inserted in a first or inner end a female portion 18 of a connecting device. The rearward portion 16 has projected from a first or inner end a male portion 20 of the connecting device.

As best illustrated in FIGS. 8-10, the forward and rearward sections 14 and 16 are releasably interconnected by the connecting device including the male portion 20 and the female portion 18. The female portion 18 is generally tubular having an annular lip 22 projected inwardly at a first end thereof. A keyway 24 is formed in the annular lip 22. The female portion 18 is received in the inner end of the forward section 14.

The male portion 20 consists of a generally cylindrical body member 26 and a tooth 28 projected radially outward therefrom near a first end of the body member 26. The male portion 20 is received in the inner end of the rearward section 16. The two sections 14 and 16 are interconnected by aligning the tooth 28 with the keyway 24 and inserting the male portion 20 inside the female portion 18. The two sections 14 and 16 are then relatively rotated so that the tooth 28 is captured behind the lip 22 when in normal use.

Also included in the side bumper 10 are a plurality of suction cups 30 and magnet strips 32 (FIGS. 2 and 7) which extend below the bottom surface of the side bumper 10 and function to assist in the releasable attachment of the side bumper 10 to a vehicle 12 as will be discussed in more detail below.

The second or free end of each section 14 and 16 is finished to close the central hollow opening and to create a rounded corner. Material 36 is removed from the free end of each section as indicated by the shaded portion of FIG. 6. Upon its removal, the flap 34 that remains is glued to the rounded edge by the use of a suitable adhesive. The portion of the material removed results in the end cf the flap 34 being flush with the bottom surface of the bumper section (FIG. 7).

The structure of the side bumper further includes a pair of locking devices or tabs 33 (FIGS. 2-5). A cylindrical main body portion 35 of the locking device 33 terminates in a cylindrical end cap 36. At the opposite end, a locking ear 38 extends outwardly from the main body portion 35 at an angle. The locking ear 38 consists of a web portion 40 and a bulbous end portion 42 which has a transverse dimension greater than the thickness of the web portion 40. Neoprene rubber has been found to be suitable material for the locking devices 33.

The locking device 33 is insertable into the forward and rearward sections 14 and 16 of the side bumper 10, as illustrated in FIGS. 3-5. When attached to a vehicle, the locking ear 38 of the locking device 33 extends into the gap between a side door 50 and the fender 52 of the vehicle (FIGS. 4-5). When the door 50 is open, the gap between the side door 50 and the front fender 52 is sufficient to allow the bulbous end portion 42 of the locking device 32 to be inserted behind the door 50. When the door 50 is closed, the side bumper 10 cannot be detached from the vehicle because the bulbous end portion 42 is too large to be extracted through the gap between the fender 52 and the closed side door 50.

As best illustrated in FIGS. 3-5, the forward section 14 has material removed from it adjacent the locking device 33 in the general shape of three half cylinders, forming a first and second expansion site 44 and 46 on the bottom side of the forward section 14 and a compression site 48 on the top side of the forward section 14. In fabrication of the bumper 10, a forstner or similar bit is useful for cutting the foam material without excessive tearing. As seen in FIG. 5, wherein the door 50 opens such that its forward edge moves inwardly relative to the fender 52, the expansion and compression sites 44-48 are located rearwardly of the locking device 33. The expansion sites 44 and 46 allow the resilient material of the bumper to lengthen without tearing on the bottom side of the bumper and the compression site allows the resilient material of the bumper to be compressed without significant wrinkling or damage on the top side of the bumper. While most doors open as illustrated in FIG. 5, some vehicle doors, such as on Alfa Romeo automobiles, open such that the forward edge of the door 50 moves outwardly relative to the fender 52. In this case, the expansion and compression sites 44-48 are located forwardly of the locking device 33 (FIG. 4).

When attached to the vehicle, the suction cups 30 are pressed onto the surface of the vehicle to releasably secure the side bumper 10 to the vehicle. In a similar manner, the locking device 33 of the rearward section 16 is retained behind the rearward edge of the side door 50 and the adjacent fender of the vehicle.

As illustrated in FIG. 1, the contour of one or both of the edges of the side door may be other than vertical. In such event, the locking device 33 can be rotated relative to the side bumper 10 so that the web portion 40 of the locking device 33 is parallel to the edge contour of the door at the desired location of the side bumper 10.

Although the foregoing description of a preferred embodiment has been described in particular detail, it will be understood that variations and modifications may be effected without departing from the spirit and scope of the intention as defined in the following claims:

I claim:

1. A resilient vehicle side bumper, comprising:
   (a) a resilient body member having a forward section and a rearward section;
   (b) coacting end portions of said forward and rearward sections for releasably joining said forward and rearward sections to form said resilient body member;
   (c) means extended from the back of each of said forward and rearward sections and rotatable about an axis substantially perpendicular to the vehicle for releasably locking the side bumper to the vehicle;
   (d) expansion and compression sites adjacent said locking means for facilitating flexion of the forward section in the area of said sites; and
   (e) a plurality of releasable attachment means on rear of said body member for releasably adhering said body member to the vehicle.

2. A resilient vehicle side bumper for attachment to a door of a vehicle, comprising:
   (a) a resilient body member having a forward section and a rearward section;
   (b) means on adjacent end portions of said forward and rearward sections for releasably interconnecting said sections;
   (c) locking tabs extended from the rear of each of said sections and rotatable about an axis that is substantially perpendicular to the vehicle;
   (d) enlarged end portions of said rotatable locking tabs for capture thereof between a closed door and a fender of the vehicle; and
   (e) a plurality of releasable adhesive means on the rear of said sections for releasably adhering said body member to the side of the vehicle.

3. A resilient vehicle side bumper as defined in claim 1, wherein:
   (a) the vehicle includes a pair of side doors movable between an open and a closed position, a pair of forward fenders, and a pair of rearward fenders;
   (b) said locking means include enlarged end portion; and
   (c) said side doors in the closed position therefor are separated from said fenders by a distance less than said enlarged end portions.

4. A resilient side bumper as defined in claim 1, wherein:
   (a) the vehicle includes at least a pair of fenders and a pair of adjacent side doors and separated therefrom along a contour; and
   (b) said rotatable locking means are rotatably movable to conform to said contour.

5. A resilient vehicle side bumper as defined in claim 2, wherein:
   (a) said forward and rearward sections are extruded foam having a generally cylindrical hollow core.

6. A resilient vehicle side bumper, comprising:
   (a) a body member;
   (b) a locking device for securing said body member to said vehicle at the junction of a side door and a front fender of the vehicle;
   (c) an evacuated expansion site in said body member adjacent said locking device on the side thereof next to the vehicle;
   (d) an evacuated compression site in said body member adjacent said locking device on the side thereof opposite the vehicle.

7. A resilient vehicle side bumper as defined in claim 5, further comprising a rounded corner on one end portion of each of said forward and rearward sections formed by removal of said extruded foam material to form an extended flap and a rounded edge whereupon said flap is adhered to said rounded edge to close said hollow core.

8. A resilient vehicle side bumper as defined in claim 1, wherein:
   (a) said forward section has a back side adjacent the vehicle and a front side opposite thereto;
   (b) said expansion sites are concavities in said back surface of said forward section; and
   (c) said compression sites are concavities in said front side of said forward section.

* * * * *